United States Patent
Chen (10) Patent No.: US 10,077,090 B2
(45) Date of Patent: Sep. 18, 2018

(54) INVERTED TRICYCLE

(71) Applicant: Shengzhou Zhonggong Electrical, Ltd., Shengzhou (CN)

(72) Inventor: Hongliang Chen, Shengzhou (CN)

(73) Assignee: SHENGZHOU ZHONGGONG ELECTRICAL, LTD., Shengzhou (CN)

( * ) Notice: Subject to any disclaimer, the term of this patent is extended or adjusted under 35 U.S.C. 154(b) by 0 days.

(21) Appl. No.: 15/168,497

(22) Filed: May 31, 2016

(65) Prior Publication Data

US 2016/0355229 A1    Dec. 8, 2016

(51) Int. Cl.
| | |
|---|---|
| *B60K 5/02* | (2006.01) |
| *B62K 5/027* | (2013.01) |
| *B62K 5/05* | (2013.01) |
| *B62K 5/08* | (2006.01) |
| *B62K 5/10* | (2013.01) |
| *B62K 5/06* | (2006.01) |
| *B62K 25/04* | (2006.01) |

(52) U.S. Cl.
CPC ............... *B62K 5/027* (2013.01); *B62K 5/05* (2013.01); *B62K 5/06* (2013.01); *B62K 5/08* (2013.01); *B62K 5/10* (2013.01); *B62K 25/04* (2013.01); *B62K 2202/00* (2013.01)

(58) Field of Classification Search
CPC .......... B62K 5/027; B62K 25/04; B62K 5/06; B62K 5/10; B62K 5/08; B62K 5/05; B62K 2202/00
See application file for complete search history.

(56) References Cited

U.S. PATENT DOCUMENTS

| | | | |
|---|---|---|---|
| 7,887,070 B2 * | 2/2011 | Kirchner | B62K 5/027 280/124.103 |
| 8,317,207 B2 * | 11/2012 | Mercier | B60G 21/007 180/210 |
| 8,814,186 B1 | 8/2014 | Rinda | |
| 2002/0190494 A1 * | 12/2002 | Cocco | B60G 7/00 280/124.134 |

(Continued)

OTHER PUBLICATIONS

The extended European Search Report Application No. 16161441.7.

*Primary Examiner* — Darlene P Condra
(74) *Attorney, Agent, or Firm* — Steven M. Shape; Dennemeyer & Associates, LLC (57) ABSTRACT

An inverted tricycle, which includes: deflecting and steering mechanism, rear frame, driving wheel, two front wheels, said deflecting and steering mechanism configured on the front end of said rear frame, said two front wheels and said deflecting and steering mechanism connected to each other, and symmetrically configured on the left and right sides of the front end of said rear frame, with the rear frame as the axis of symmetry, said driving wheel configured on the rear end of said rear frame. By adopting the above technical scheme, the left and right rocker arms are hinged to the main frame along the same axis. When the tricycle is turned or tilted, they can be always parallel to each other, and the driving will be more stable. The left and right rocker arms are two independent gravity center deflection systems that will not interfere with each other; meanwhile, the structure with single damper can greatly reduce the manufacturing cost of the present invention.

18 Claims, 11 Drawing Sheets

(56) References Cited

U.S. PATENT DOCUMENTS

| | | | |
|---|---|---|---|
| 2007/0151780 A1* | 7/2007 | Tonoli | B60G 17/015 |
| | | | 180/65.1 |
| 2007/0182120 A1* | 8/2007 | Tonoli | B60G 17/015 |
| | | | 280/124.142 |
| 2007/0193815 A1* | 8/2007 | Hobbs | B60G 21/007 |
| | | | 180/348 |
| 2008/0012262 A1* | 1/2008 | Carabelli | B60G 7/006 |
| | | | 280/124.106 |
| 2011/0056756 A1* | 3/2011 | Murad | B62K 5/027 |
| | | | 180/65.31 |
| 2011/0248467 A1* | 10/2011 | Ball | B62K 3/005 |
| | | | 280/259 |
| 2011/0298191 A1 | 12/2011 | Pozio | |
| 2012/0119453 A1* | 5/2012 | Mercier | B62D 9/02 |
| | | | 280/5.51 |
| 2012/0119462 A1* | 5/2012 | Mercier | B60G 21/007 |
| | | | 280/124.103 |
| 2013/0214503 A1* | 8/2013 | Chiuppani | B60G 5/025 |
| | | | 280/124.103 |
| 2014/0375015 A1* | 12/2014 | Yu | B62K 5/027 |
| | | | 280/267 |
| 2015/0122566 A1 | 5/2015 | Constien | |

* cited by examiner

INVERTED TRICYCLE

BACKGROUND OF INVENTION

1. Field of the Invention

The present invention relates generally to an inverted tricycle structure.

2. Description of Related Art

An inverted tricycle is a special vehicle which has two front steering wheels. In comparison to a bicycle, as it has one more wheel to touch the ground, it offers better stability on slippery road surfaces, and can substantially reduce the possibility of sideslip and fall of the rider. In complex road environments, its driving safety is much better than a bicycle.

In the structure of a prior-art inverted tricycle, in order to enhance the adaptability of the two front steering wheels to rugged terrains, and make it possible that the vehicle body will not tilt when the ground surfaces touched by the left and right wheels are at different levels, generally the left wheel and right wheel are supported on the left and right ends of the rocker arm through four front dampers. In such a structure, the front dampers are subject to massive lateral forces, which may easily cause failure or danger. Also, in the prior-art inverted tricycle, the main motion components are dispersed on the steering sleeve and suspension system, featuring high gravity centers and indirect motion transmission. Such a far-fetched motion transmission structure will naturally result in a higher rate of failure and lower driving flexibility. Furthermore, the rocker arms are installed on the sleeve of the steering column above the frame, and the steering column sleeve is a hollow piece. This is also an unsafe factor. Moreover, the prior-art main frame structure has insufficient rigidity and the manufacturing processes are quite complicated. Therefore, there is a necessary to improve the prior-art inverted tricycle and deflecting and steering system.

SUMMARY OF THE INVENTION

The technical problem to be solved by the present invention is to overcome defects of the prior art and provide an inverted tricycle, the technical scheme is that an inverted tricycle, including: a deflecting and a steering mechanism, a rear frame, a driving wheel, and two front wheels, said deflecting and steering mechanism being configured on the front end of said rear frame, said two front wheels and said deflecting and steering mechanism being connected, and symmetrically configured on the left and right sides of the front end of the rear frame, with said rear frame as the axis of symmetry, and said driving wheel being configured on the rear end of said rear frame.

More preferably, wherein said deflecting and steering mechanism of the inverted tricycle includes main frame, left front arm component and right front arm component symmetrically configured on the two sides of said main frame;

said left front arm component includes left upper rocker arm, left lower rocker arm and left steering joint structure, the first end of said left upper rocker arm is hinged to said main frame through first pivotal structure, the first end of said left lower rocker arm is hinged to said main frame through second pivotal structure, the second ends of said left upper rocker arm and left lower rocker arm are respectively hinged to the upper and lower ends of said left steering joint structure through third pivotal structure and fourth pivotal structure, and the axes of rotation of said first pivotal structure, second pivotal structure, third pivotal structure, and fourth pivotal structure are perpendicular to the same plane;

said right front arm component includes right upper rocker arm, right lower rocker arm and right steering joint structure, the first end of said right upper rocker arm is hinged to said main frame through fifth pivotal structure, the first end of said right lower rocker arm is hinged to the main frame through sixth pivotal structure, the second ends of said right upper rocker arm and right lower rocker arm are respectively hinged to the upper and lower ends of said right steering joint structure through seventh pivotal structure and eighth pivotal structure, and the axes of rotation of fifth pivotal structure, sixth pivotal structure, seventh pivotal structure, and eighth pivotal structure are perpendicular to the same plane;

said first pivotal structure and said fifth pivotal structure share the same axis, and said second pivotal structure and said sixth pivotal structure share the same axis;

the deflecting and steering mechanism of said inverted tricycle also includes a steering structure, said steering structure including front steering column, main steering column, universal steering mechanism, said front steering column equipped through said main frame, the upper end of said front steering column connected to said main steering column, while its lower end connected to the middle position of said universal steering mechanism, the two ends of said universal steering mechanism respectively connected to left steering joint structure and right steering joint structure.

More preferably, wherein said universal steering mechanism includes cross axle, left connecting rod, and right connecting rod, the lower end of said front steering column hinged to the first axle portion of said cross axle, the second axle portion of said cross axle hinged to said left connecting rod and right connecting rod, said left connecting rod connected to said left steering joint structure and said cross axle, while said right connecting rod connected to said right steering joint structure and said cross axle.

More preferably, wherein said universal steering mechanism includes left pull rod and right pull rod, the two ends of said left pull rod and said right pull rod respectively configured with rod end knuckle bearings; the inner ring body of the rod end knuckle bearing on the inner side of said left pull rod is connected to the inner ring body of the rod end knuckle bearing on the inner side of said right pull rod.

More preferably, wherein said left pull rod is connected to said left steering joint structure through the inner ring body of the rod end knuckle bearing on its outer side, said right pull rod is connected to said right steering joint structure through the inner ring body of the rod end knuckle bearing on its outer side; the locking bolt goes through the center hole of the inner ring body of the rod end knuckle bearing on the inner side of said right pull rod as well as the center hole of the inner ring body of the rod end knuckle bearing on the inner side of said left pull rod, and connected to the bottom end of said front steering column.

More preferably, wherein said left pull rod and said right pull rod are in a back-forth or up-down arrangement.

More preferably, wherein the connection line between the center point of the inner ring body of the rod end knuckle bearing on the outer side of said left pull rod and the center point of said driving wheel intersects the axis of rotation of said left steering joint structure; the connection line between the center point of the inner ring body of the rod end knuckle bearing on the outer side of said right pull rod and the center point of said driving wheel intersects the axis of rotation of said right steering joint structure.

More preferably, wherein said main frame includes front frame and main beam, said main beam being in a "C" shape, and said front frame configured on the open side of the "C" shape of said main beam.

More preferably, wherein said main beam includes said C-shaped beam body, said C-shaped beam body having a top longitudinal extending portion and a bottom longitudinal extending portion; said top longitudinal extending portion, bottom longitudinal extending portion, and C-shaped beam body are formed integrally; the top of said top longitudinal extending portion is provided with a front steering column mounting hole, and the top longitudinal extending portion combines with the front steering column through the front steering column mounting hole; said front steering column is equipped through the front steering column mounting hole of said main beam, and the bottom end of said front steering column extends downward to the inner space of the C shape of the C-shaped beam body of the main beam.

More preferably, wherein the upper portion of the front side of said top longitudinal extending portion is provided with a front frame upper section connecting hole, while the lower portion of the front side of said top longitudinal extending portion is provided with a front frame middle section connecting hole; the rear side of said top longitudinal extending portion is provided with a rear frame upper section connecting hole; said top longitudinal extending portion fixes and connects to the upper section of the front frame through the front frame upper section connecting hole, and fixes and connects to the middle section of the front frame through the front frame middle section connecting hole; said top longitudinal extending portion fixes and connects to the upper section of the rear frame through the rear frame upper section connecting hole.

More preferably, wherein the front side of said bottom longitudinal extending portion is provided with a front frame lower section connecting hole; the rear side of said bottom longitudinal extending portion is provided with a rear frame lower section connecting hole; said bottom longitudinal extending portion fixes and connects to the lower section of the front frame through the front frame lower section connecting hole, and fixes and connects to the lower section of the rear frame through the rear frame lower section connecting hole.

More preferably, wherein the rear side of said C-shaped beam body is provided with a rear frame middle section connecting hole; said C-shaped beam body fixes and connects to the rear frame through the rear frame middle section connecting hole.

More preferably, wherein said main beam is formed integrally.

More preferably, wherein said left steering joint structure and right steering joint structure include upper rotary head, lower rotary head, center axle, and sleeve, said center axle connecting said upper rotary head and lower rotary head, said sleeve encasing said center axle, said sleeve and said center axle connected through the bearing, and said sleeve also configured with an axle to mount the wheel.

More preferably, wherein the center line of the sleeve and the axle to mount the wheel cross each other vertically in a three-dimensional space; a water-proof seal ring is arranged between said sleeve and said center axle.

More preferably, wherein said deflecting and steering mechanism also includes a wheel unit, said wheel unit equipped on the axle of said sleeve to mount the wheel.

More preferably, wherein said wheel unit includes a wheel, said wheel provided with an axle hole, with oil seal, bearing, and bearing bush serially configured inside the axle hole, the end cap is configured on the outer end of the axle hole, and a brake disc is fixed on the inner side of the axle hole through a screw; the periphery of said wheel is configured with a spoke, and outside the spoke, a rim is provided.

More preferably, wherein said left lower rocker arm and said right lower rocker arm are respectively configured with supporting pieces, and a damping system is connected to the supporting pieces on said left and right lower rocker arms.

More preferably, wherein the upper end of said front steering column is in a ring shape, said left upper rocker arm and said right upper rocker arm are respectively configured with supporting pieces, a damping system is connected to the supporting pieces on said left and right upper rocker arms, and said damping system goes through the ring shape of the upper end of said front steering column.

More preferably, wherein the axis line of said damping system share the same plane with said left and right steering joint structures.

Compared with the prior art, the present invention has the beneficial effects are that:

1. The left and right rocker arms are respectively hinged to the main frame along the same axis, so that they can be always parallel to each other when the tricycle is turned or tilted, and the driving will be more stable. The left and right rocker arms are independent gravity center deflection systems that will not interfere with each other;
2. The steering joint realizes rotation through the universal steering mechanism to turn the vehicle, and the main steering column drives the front steering column, and then drives the universal steering mechanism to move left or right. Under the parallelogram movement mode for left-right steering and left-right deflection within a three-dimensional space, it is guaranteed that, under any condition or any movement mode, the axles of the wheels mounted on the left and right will always be parallel to each other. The middle-positioned two-way cross axle structure in the steering system will not change the original axis of rotation under any movement mode, while maintaining the ability of unsynchronized movement on one side of the left and right rocker arm system. In consideration of the complex structure and high cost of the cross axle, the present invention offers another structural scheme for the universal steering mechanism, wherein the diameter of the inner ring body of the rod end knuckle bearing is enlarged to obtain a larger angle range for rotation. The two inner ring bodies of the two rod end knuckle bearing connecting the front steering column are mounted on the same axle for synchronous movement.
3. The main beam is formed integrally for better strength and rigidity; in the overall arrangement, as the C-shaped opening is facing the front of the vehicle, and meanwhile, the left and right pull rods for steering are arranged in the front, the steering pull rods can have sufficient movement space in the three-dimensional movement relationship. The movement range is substantially enlarged. By leveraging the space of the opening end and the strength of the closed end of the C shape, the movement range of the left and right steering pull rods are enlarged while reducing the overall size of the main frame. Moreover, the main beam of the main frame can be formed integrally in one production.
4. The upper end of the front steering column is in a ring shape. The ring shape can provide avoiding space for the damping mechanism, so that the left and right rocker arms can receive force from the damper more evenly, and the strength of the suspension system of the overall vehicle can be guaranteed with relatively low strength of the rocker arm structure; while reducing the weight under the spring of the suspension system, the stability is substantially enhanced and production and usage costs are also substantially reduced; as the axis line of the damper share the same plane with the axis line of the left and right steering joints, even under abnormal usage conditions, there is no tendency that the front wheel and front damper will interfere with each other. On the premise that the overall length of the damper is fixed, the track width between the two front wheels can be minimized.

Comparing to the prior-art inverted tricycle, the deflecting and steering mechanism of an inverted tricycle developed by us features simpler structure and lower cost. Due to the obvious advantages in technology and cost control, it will surely have a large market.

DETAILED DESCRIPTION OF THE INVENTION

Figure 1:
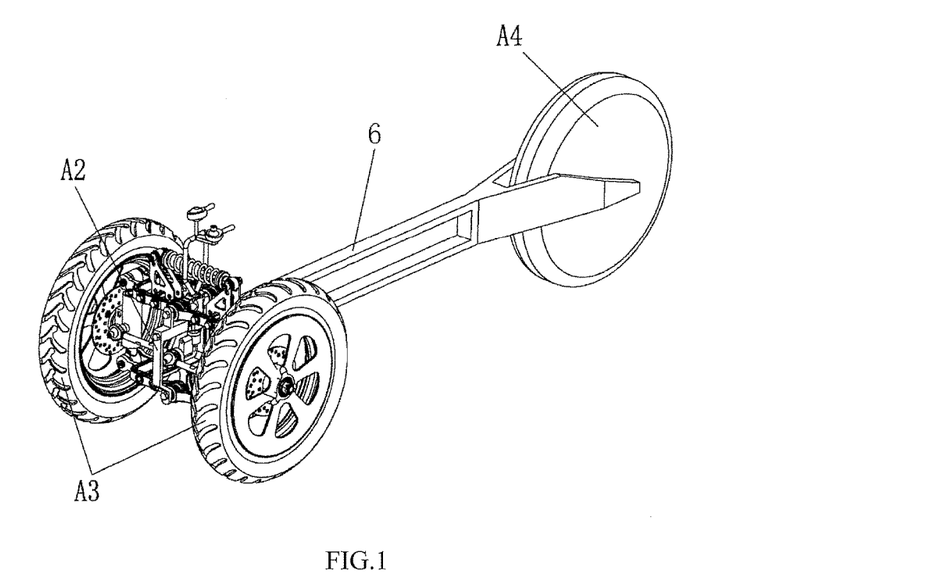
FIG. 1 is a schematic structural view of the present invention of an inverted tricycle.
Figure 2:
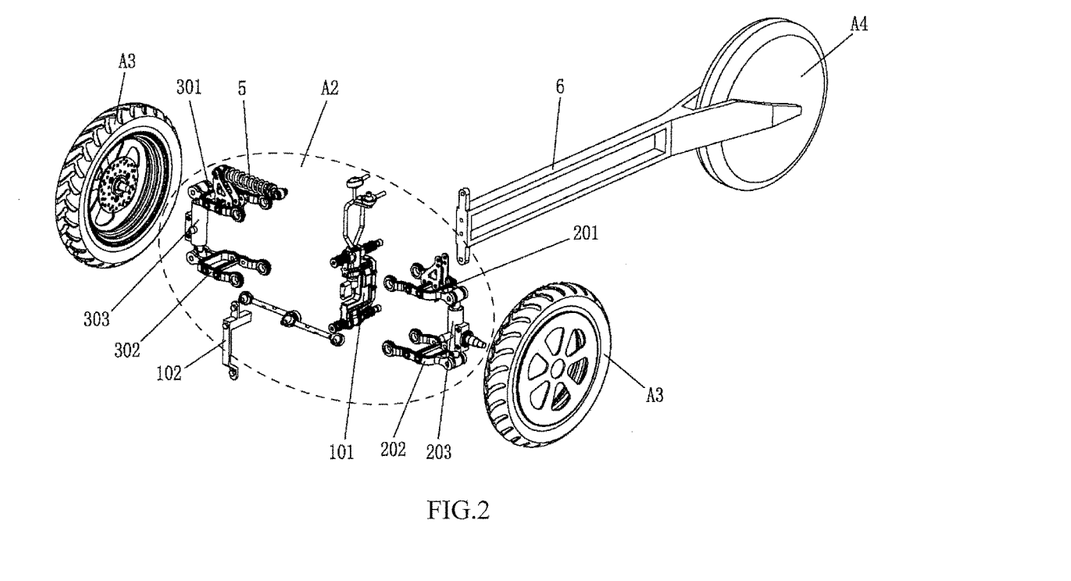
FIG. 2 is an exploded structural view of the present invention of an inverted tricycle.

Referring to FIGS. 1 and 2, a first embodiment of the present invention of an inverted tricycle is disclosed. In this embodiment, the deflecting and steering mechanism of the inverted tricycle includes: deflecting and steering mechanism A2, rear frame 6, driving wheel A4, two front wheels A3, said deflecting and steering mechanism A2 being configured on the front end of said rear frame 6, said two front wheels A3 and said deflecting and steering mechanism A2 being connected, and symmetrically configured on the left and right sides of the front end of said rear frame 6, with said rear frame 6 as the axis of symmetry, and said driving wheel A4 being configured on the rear end of said rear frame 6.

Figure 3:
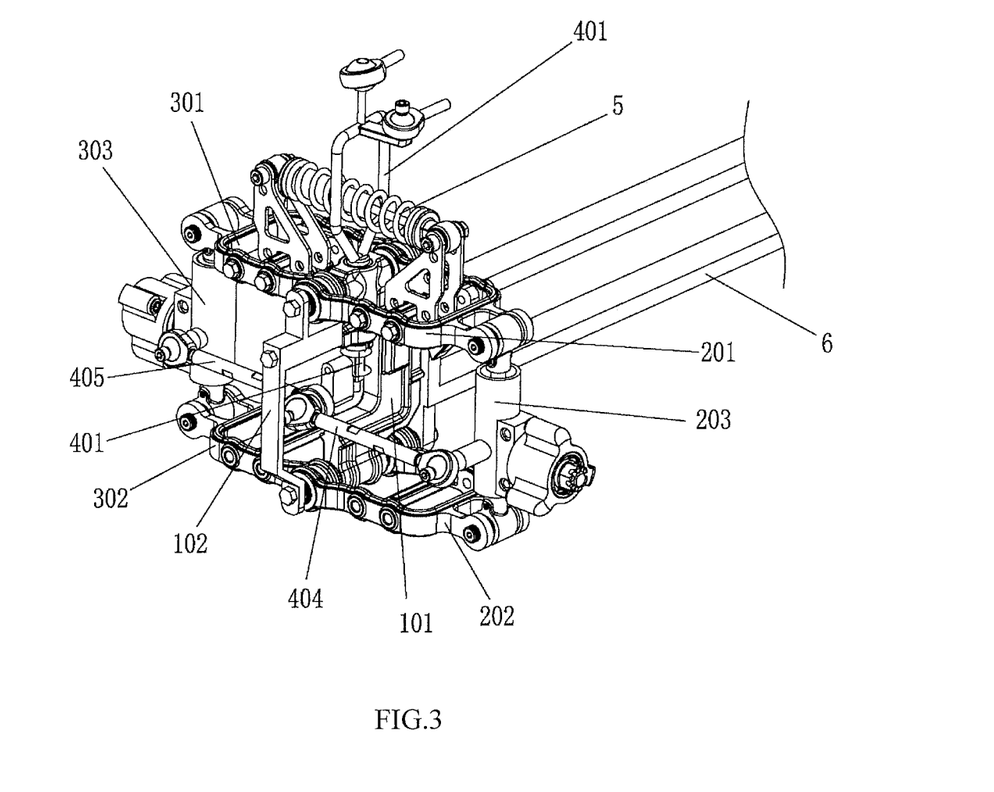
FIG. 3 is a schematic structural view of the deflecting and steering mechanism in the first embodiment of the present invention.
Figure 4:
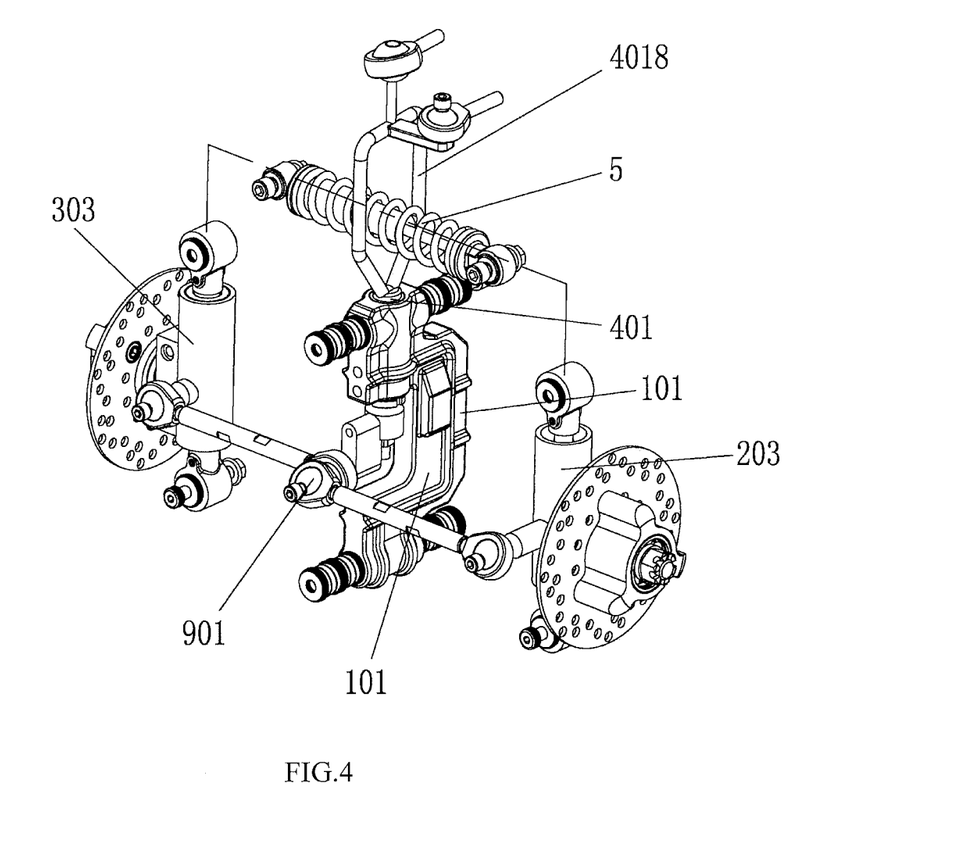
FIG. 4 is an exploded structural view of the deflecting and steering mechanism in the first embodiment of the present invention.
Figure 5:
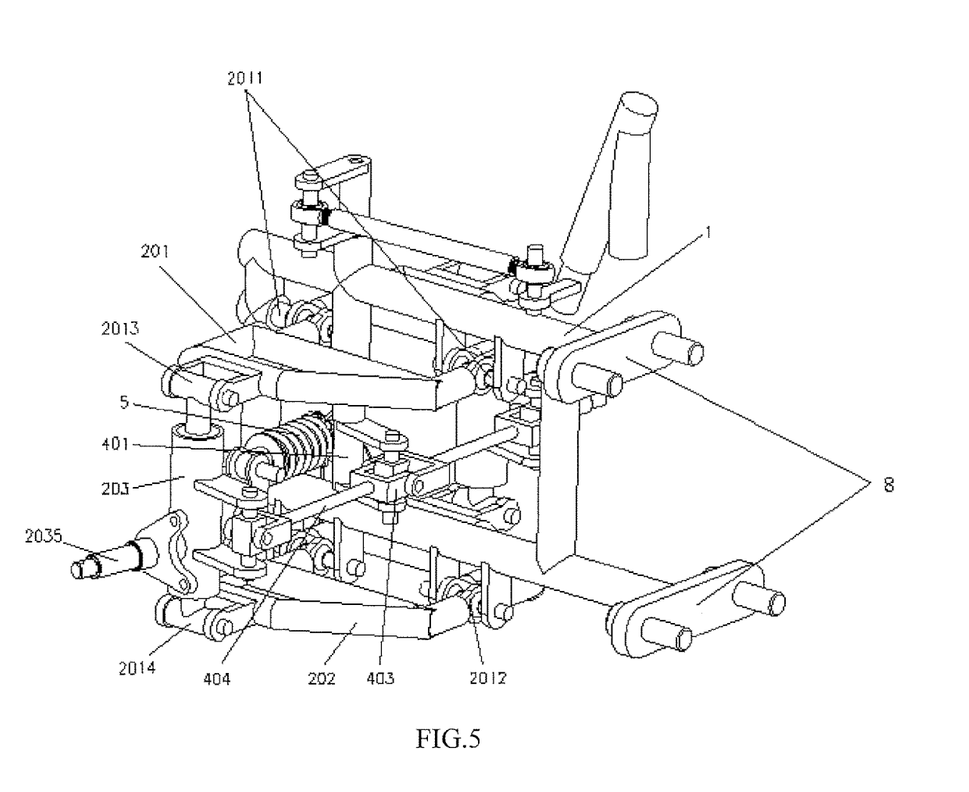
FIG. 5 is a schematic structural view of the left side of the deflecting and steering mechanism in the second embodiment of the present invention.
Figure 6:
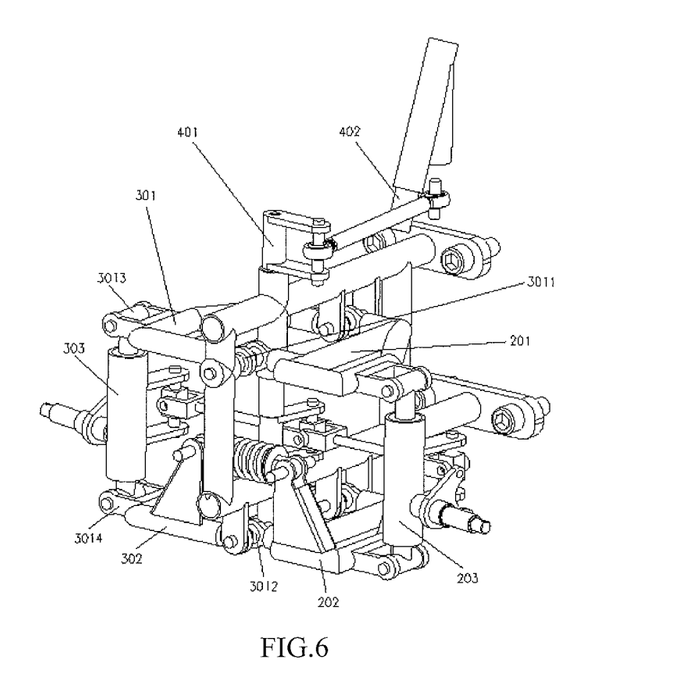
FIG. 6 is a schematic structural view of the front side of the deflecting and steering mechanism in the second embodiment of the present invention.
Figure 7:
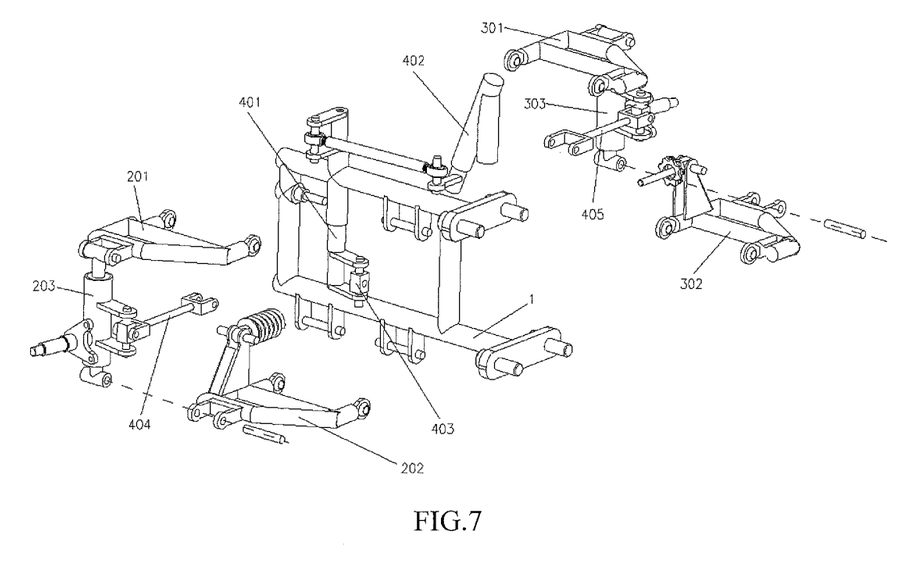
FIG. 7 is an exploded view of the deflecting and steering mechanism in the second embodiment of the present invention.

FIGS. 3 and 4 depict the deflecting and steering mechanism A2 of the first embodiment of the inverted tricycle. FIGS. 5, 6, and 7 depict another preferred embodiment, i.e., the deflecting and steering mechanism A2 of the second embodiment of the inverted tricycle. As the two embodiments share similar main structures of the deflecting and steering mechanism A2, they are hereby described together. The deflecting and steering mechanism A2 includes a main frame 1, symmetrically configured on the left front arm component and right front arm component on the two sides of said main frame 1. Said left front arm component includes left upper rocker arm 201, left lower rocker arm 202 and left steering joint structure 203. The first end of said left upper rocker arm 201 is hinged to said main frame 1 through first pivotal structure 2011. The first end of said left lower rocker arm 202 is hinged to said main frame 1 through second pivotal structure 2012. The second ends of said left upper rocker arm 201 and left lower rocker arm 202 are respectively hinged to the upper and lower ends of said left steering joint structure 203 through third pivotal structure 2013 and fourth pivotal structure 2014. The axes of rotation of said first pivotal structure 2011, second pivotal structure 2012, third pivotal structure 2013, and fourth pivotal structure 2014 are perpendicular to the same plane.

Said right front arm component includes right upper rocker arm 301, right lower rocker arm 302 and right steering joint structure 303. The first end of said right upper rocker arm 301 is hinged to said main frame 1 through fifth pivotal structure 3011. The first end of said right lower rocker arm 302 is hinged to said main frame 1 through sixth pivotal structure 3012. The second ends of said right upper rocker arm 301 and right lower rocker arm 302 are respectively hinged to the upper and lower ends of said right steering joint structure 303 through seventh pivotal structure 3013 and eighth pivotal structure 3014. The axes of rotation of said fifth pivotal structure 3011, sixth pivotal structure 3012, seventh pivotal structure 3013, and eighth pivotal structure 3014 are perpendicular to the same plane.

Said first pivotal structure 2011 and said fifth pivotal structure 3011 share the same axis. Said second pivotal structure 2012 and said sixth pivotal structure 3012 share the same axis.

Figure 8:
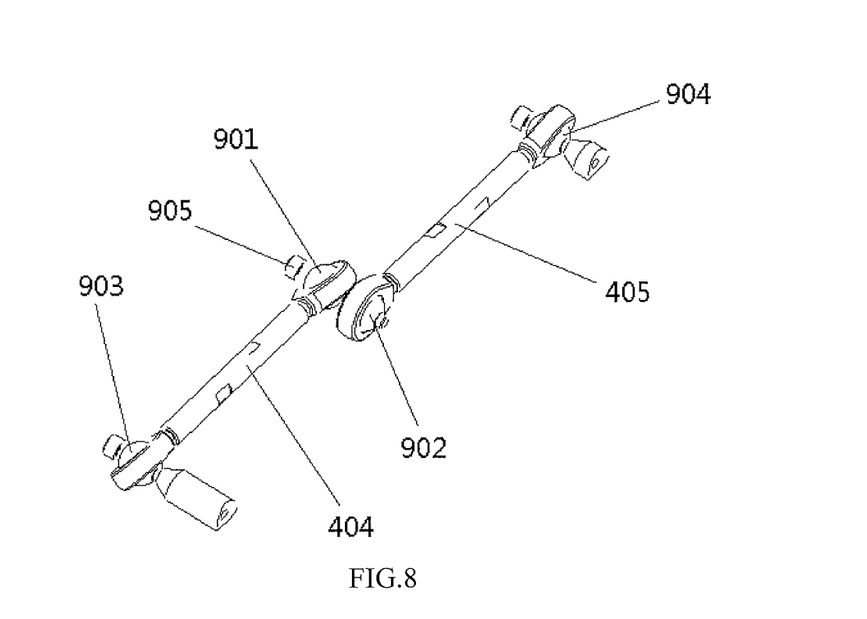
FIG. 8 is a schematic structural view of the steering structure in the first embodiment of the present invention.
Figure 9:
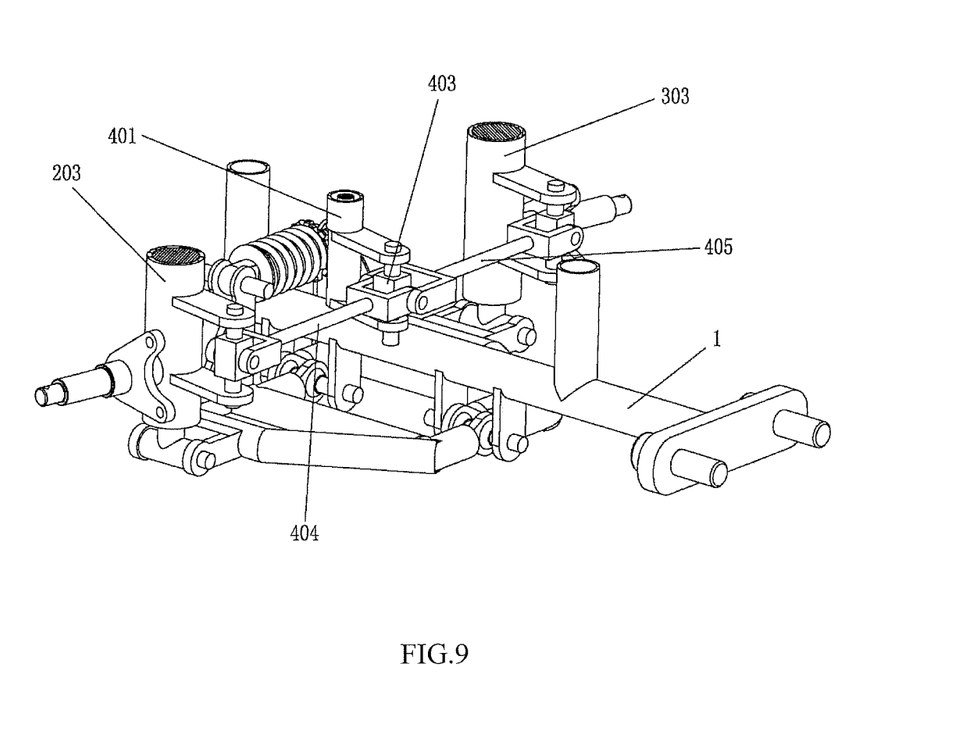
FIG. 9 is a schematic structural view of the steering structure in the second embodiment of the present invention.

The deflecting and steering mechanism of said inverted tricycle also includes a steering structure. The steering structure of the first embodiment is depicted in FIG. 8, being a rod end knuckle bearing structure. The steering structure of the second embodiment is depicted in FIG. 9, being a cross axle structure. The cross axle structure is complicated and costly, while in the technical scheme of the first embodiment of the rod end knuckle bearing, the diameter of the inner ring body of the rod end knuckle bearing is enlarged for a larger angle range of rotation. The two inner ring bodies of the two rod end knuckle bearings that are connected with the front steering column are positioned on the same axle for synchronous movement.

Said steering structure includes front steering column 401, main steering column 402, cross axle 403, left connecting component, said front steering column 401 equipped through said main frame 1, said deflecting and steering mechanism being a left-right symmetric structure, said front steering column 401 going through the symmetric plane of said main frame 1, the upper end of said front steering column 401 is connected with said main steering column 402, while its lower end is connected to the middle position of said universal steering mechanism, the two ends of said universal steering mechanism are respectively connected to said left steering joint structure 203 and right steering joint structure 303.

Figure 15:
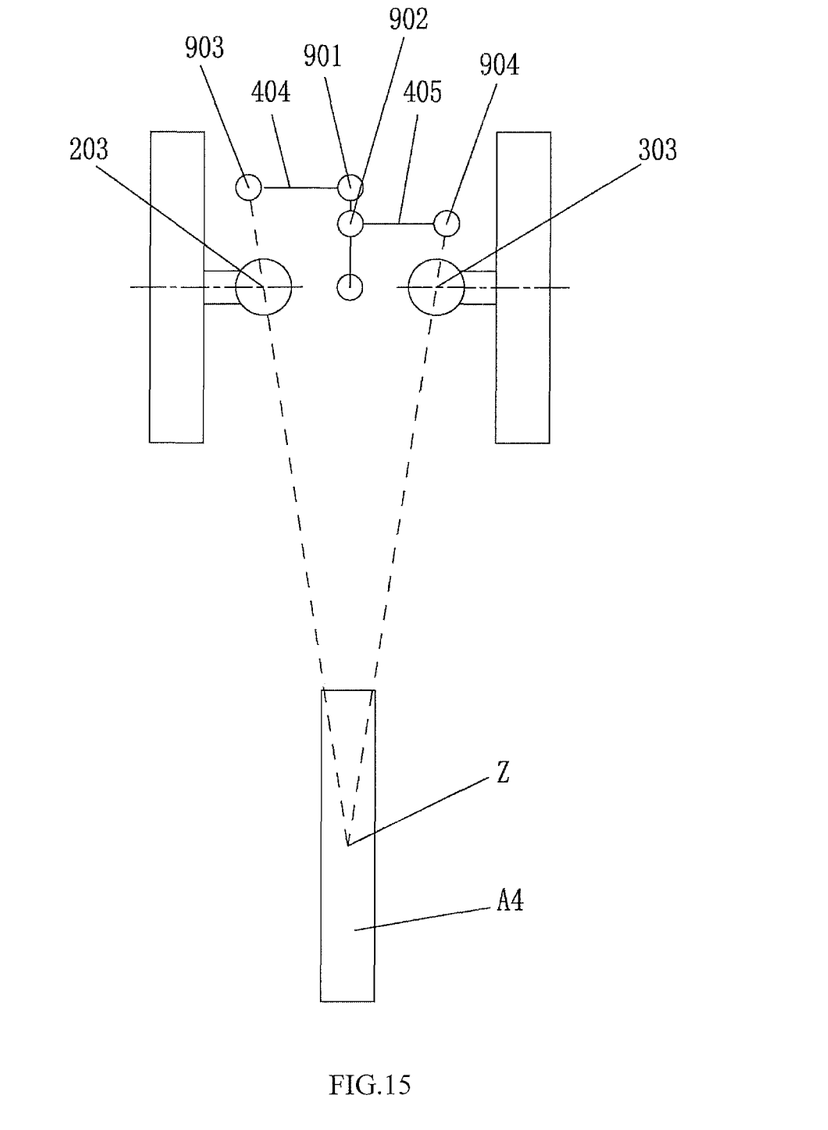
FIG. 15 is a schematic structural view of the steering structure in the first embodiment of the present invention.

The universal steering mechanism of the first embodiment is depicted in FIG. 8, and includes left pull rod 404, right pull rod 405, the two ends of left pull rod 404 and right pull rod 405 respectively configured with rod end knuckle bearings;

The inner ring body 901 of the rod end knuckle bearing on the inner side of the left pull rod 404 is fixed and connected to the inner ring body 902 of the rod end knuckle bearing on the inner side of the right pull rod 405; said left pull rod 404 is connected to the left steering joint structure 203 through the inner ring body 903 of the rod end knuckle bearing on its outer side, while said right pull rod 405 is connected to the right steering joint structure 303 through the inner ring body 904 of the rod end knuckle bearing on its outer side; the locking bolt passes through the center hole of the inner ring body 902 of the rod end knuckle bearing on the inner side of the right pull rod 405 as well as the center hole of the inner ring body 901 of the rod end knuckle bearing on the inner side of the left pull rod 404 and connected to the bottom end of the front steering column 401. The assembled structure is depicted in FIG. 15. The connecting line between the center point of the inner ring body 903 of the rod end knuckle bearing on the outer side of said left pull rod 404 and the center point Z of the driving wheel A4 intersects the axis of rotation of the left steering joint structure 203; the connecting line between the center point of the inner ring body 904 of the rod end knuckle bearing on the outer side of said right pull rod 405 and the center point Z of the driving wheel A4 intersects the axis of rotation of the right steering joint structure 303.

Said left pull rod 404 and right pull rod 405 are in a back-forth or up-down arrangement.

The universal steering mechanism in the second embodiment is depicted in FIG. 9, including a cross axle 403, left connecting rod 404, and right connecting rod 405, the lower end of said front steering column 401 being hinged to the first axle portion of said cross axle 403, the second axle portion of said cross axle 403 is hinged to said left connecting rod 404 and right connecting rod 405, said left connecting rod 404 being connected to said left steering joint structure 203 and said cross axle 403, said right connecting rod 405 being connected to said right steering joint structure 303 and said cross axle 403. Said left steering joint structure 203 and said left connecting rod 404 are also connected through a cross axle, said right steering joint structure 303 and said right connecting rod 405 are also connected through a cross axle.

Figure 10:
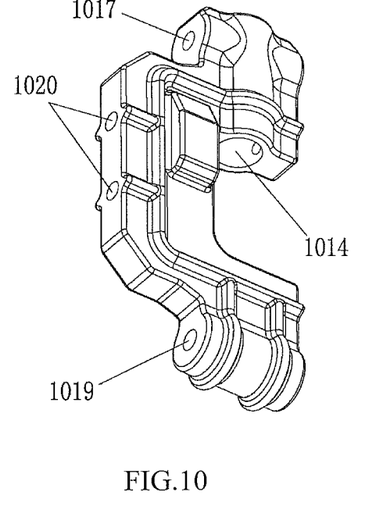
FIG. 10 is a forward schematic structural view of the main beam in the first embodiment of the present invention.
Figure 11:
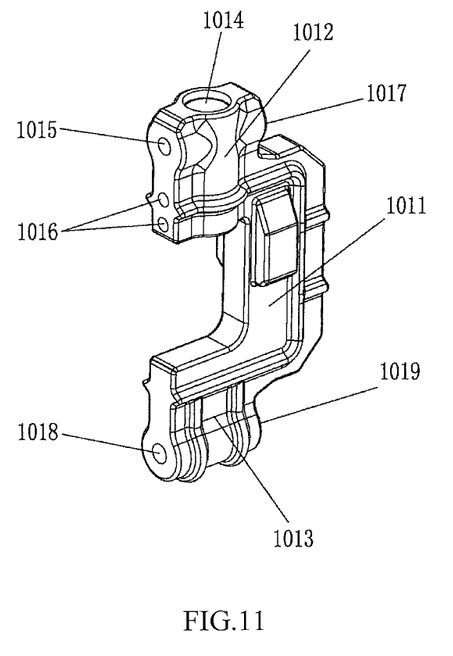
FIG. 11 is a reverse schematic structural view of the main beam in the first embodiment of the present invention.

In the first embodiment, the main frame 1 includes front frame 102 and main beam 101, said main beam 101 being in a "C" shape, said front frame 102 being configured on the side of the opening of the "C" shape of the main beam 101. Referring to FIG. 10 and FIG. 11, said main beam 101 includes said C-shaped beam body 1011, said C-shaped beam body 1011 having a top longitudinal extending portion 1012 and a bottom longitudinal extending portion 1013; Said top longitudinal extending portion 1012, bottom longitudinal extending portion 1013 and C-shaped beam body 1011 are integrally formed. The top of said top longitudinal extending portion 1012 is provided with a front steering column mounting hole 1014, and the top longitudinal extending portion 1012 combines with the front steering column 401 through the front steering column mounting hole 1014. Said front steering column 401 is equipped through the front steering column mounting hole 1014 of main beam 101, and the bottom end of said front steering column 401 extends downward to the inner space of the C shape of the C-shaped beam body 1011 of the main beam 101.

The upper portion of the front side of said top longitudinal extending portion 1012 is provided with a front frame 102 upper section connecting hole 1015, while the lower portion of the front side of said top longitudinal extending portion 1012 is provided with a front frame 102 middle section connecting hole 1016; the rear side of said top longitudinal extending portion 1012 is provided with a rear frame 6 upper section connecting hole 1017; said top longitudinal extending portion 1012 fixes and connects to the upper section of the front frame 102 through the front frame 102 upper section connecting hole 1015, and fixes and connects to the middle section of the front frame 102 through the front frame 102 middle section connecting hole 1016; said top longitudinal extending portion 1012 fixes and connects to the upper section of the rear frame 6 through the rear frame 6 upper section connecting hole 1017.

The front side of said bottom longitudinal extending portion 1013 is provided with a front frame 102 lower section connecting hole 1018; the rear side of said bottom longitudinal extending portion 1013 is provided with a rear frame 6 lower section connecting hole 1019;

Said bottom longitudinal extending portion 1013 fixes and connects to the lower section of the front frame 102 through the front frame 102 lower section connecting hole, and fixes and connects to the lower section of the rear frame 6 through the rear frame 6 lower section connecting hole 1019.

Meanwhile, the upper portion of the front side of said top longitudinal extending portion 1012 is provided with a front frame 102 upper section connecting hole 1015, and the rear frame 6 upper section connecting hole 1017 provided on the rear side of said top longitudinal extending portion 1012 shares the same axle hole, to fix the left upper rocker arm 201 and right upper rocker arm 301 together, to form a pivotal structure.

The front frame 102 lower section connecting hole 1018 provided on the front side of said bottom longitudinal extending portion 1013 and the rear frame 6 lower section connecting hole 1019 provided on the rear side of said bottom longitudinal extending portion 1013 share the same axle hole, to fix the left lower rocker arm 202 and right lower rocker arm 302 together, to form a pivotal structure.

The rear side of said C-shaped beam body 101 is provided with a rear frame 6 middle section connecting hole 1020; said C-shaped beam body 101 fixes and connects to the rear frame 6 through the rear frame 6 middle section connecting hole 1020.

Said main beam 101 is integrally formed in a C shape to offer better strength. It is a change to the complex structure of the prior-art main frame, and the manufacturing processes are simplified.

Figure 12:
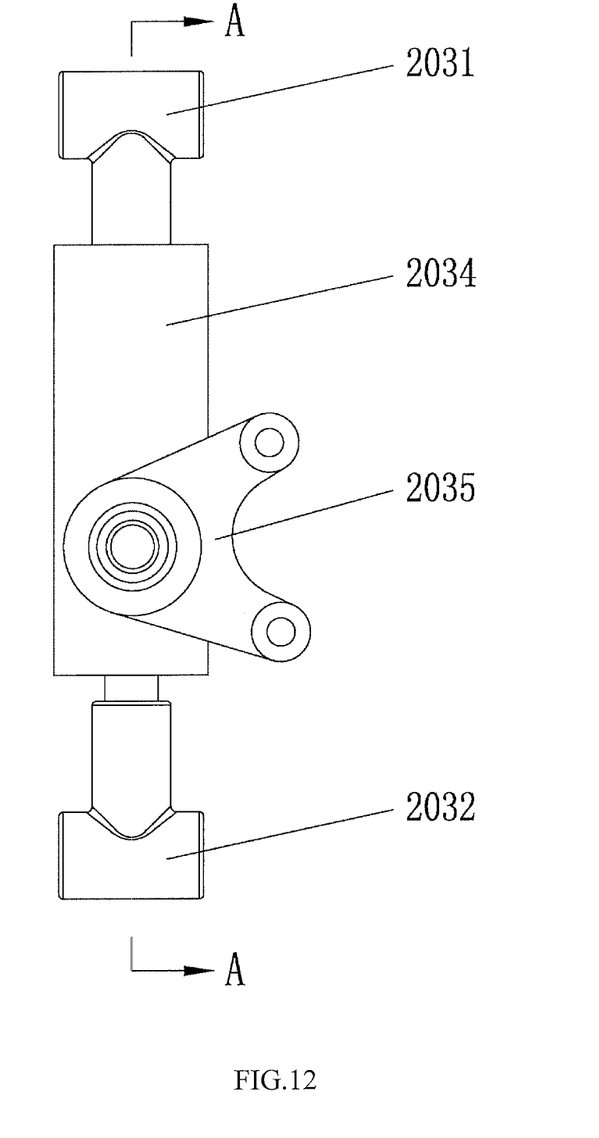
FIG. 12 is a schematic structural view of the left and right steering joint structures in the present invention.
Figure 13:
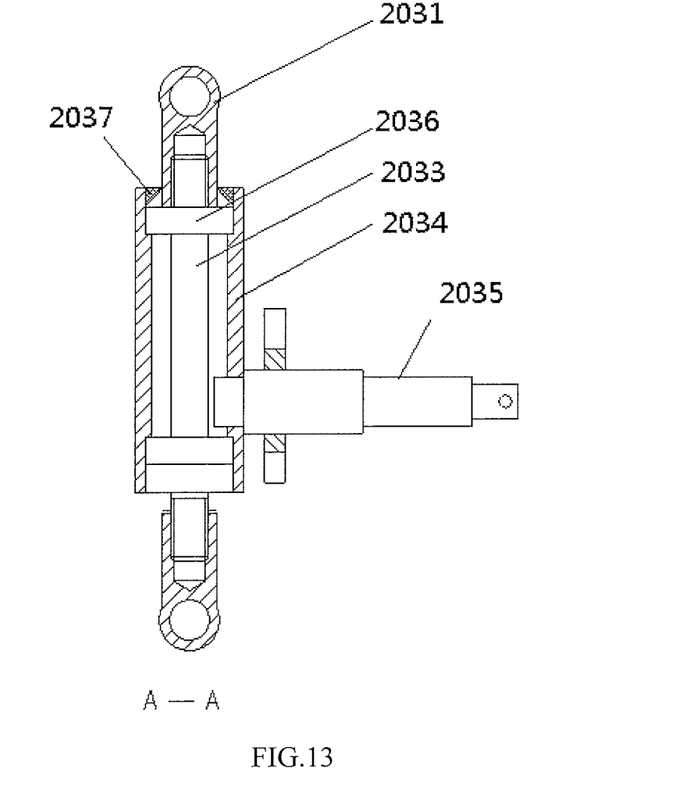
FIG. 13 is an A-A directional view of FIG. 12.

Referring to FIG. 12 and FIG. 13, said left steering joint structure 203 and right steering joint structure 303 include upper rotary head 2031, lower rotary head 2032, center axle 2033, and sleeve 2034, said center axle 2033 connecting said upper rotary head 2031 and lower rotary head 2032, said sleeve 2034 encasing said center axle 2033, said sleeve 2034 and said center axle 2033 connected through the bearing 2036, and said sleeve 2034 also configured with an axle 2035 to mount the wheel. Said upper rotary head 2031 and upper rocker arm form said first pivotal structure 2013 and said fifth pivotal structure 3013, while said lower rotary head 2032 and lower rocker arm form said first pivotal structure 2014 and said fifth pivotal structure 3014. Said first pivotal structure 2013, 2014, and said fifth pivotal structure 3013, 3014 are both hinge structures.

The center line of said sleeve 2034 and the axle 2035 to mount the wheel cross each other vertically in a three-dimensional space; a water-proof seal ring 2037 is arranged between said sleeve 2034 and said center axle 2033.

Figure 14:
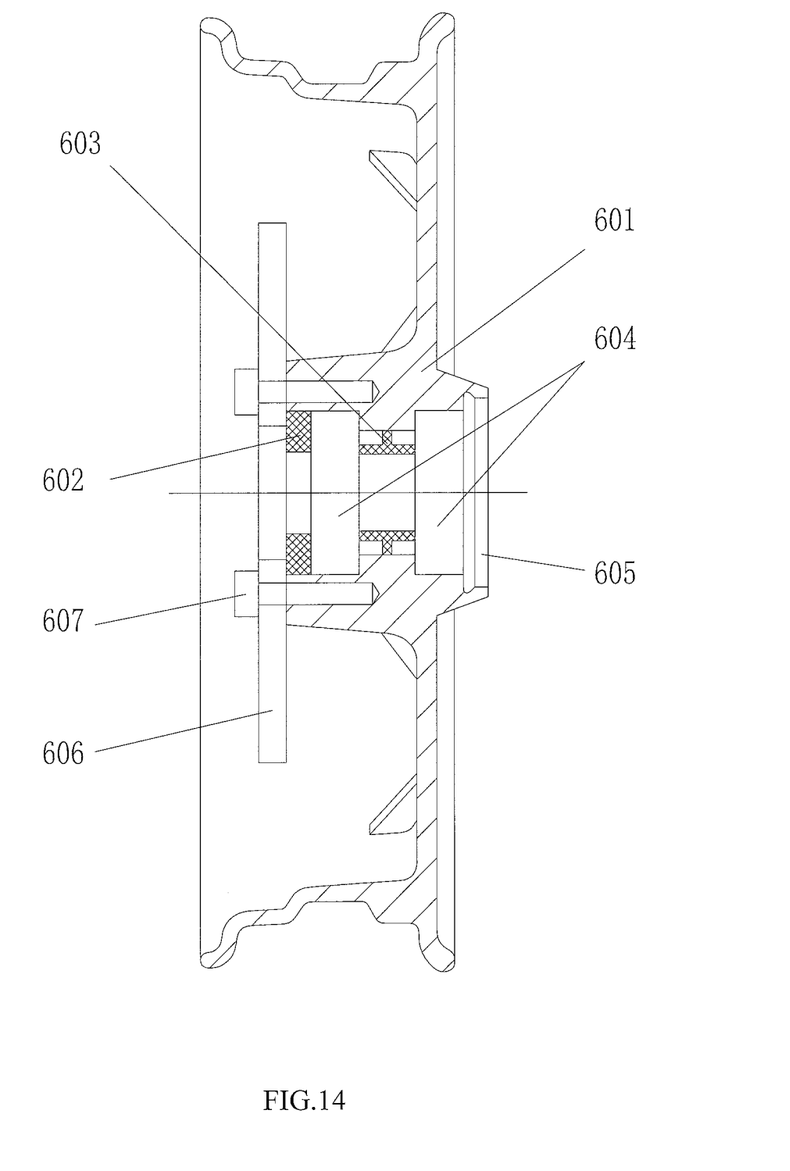
FIG. 14 is a schematic structural view of the wheel in the present invention.

Referring to FIG. 14, the deflecting and steering mechanism of said inverted tricycle also includes a wheel unit, said wheel unit equipped on the axle 2035 of said sleeve 2034 to mount the wheel.

Said wheel unit includes a wheel 601, said wheel 601 provided with an axle hole, with oil seal 602, bearing 604, and bearing bush 603 serially configured inside the axle hole, the end cap 605 is configured on the outer side end of the axle hole, and a brake disc 606 is fixed on the inner side of the axle hole through a screw 607; the periphery of said wheel is configured with a spoke, and outside the spoke, a rim is provided.

Referring to FIGS. 3 and 4, the upper end 4018 of said front steering column 401 is in a ring shape, said left upper rocker arm and said right upper rocker arm are respectively configured with supporting pieces, a damping system 5 is connected to the supporting pieces on said left and right upper rocker arms, and said damping system 5 goes through the ring shape of the upper end 4018 of said front steering column.

The axis line of said damping system 5 shares the same plane with said left and right steering joint structures 203, 303. Therefore, even under abnormal usage conditions, there is no tendency that the front wheel and the damping system will interfere with each other. On the premise that the overall length of the damper is fixed, the track width between the two front wheels can be minimized.

In the second embodiment, referring to FIGS. 5, 6, and 7, said left lower rocker arm 202 and said right lower rocker arm 302 are respectively configured with supporting pieces, and a damping system 5 is connected to the supporting pieces on said left and right lower rocker arms. Alternatively, the layout structure of the front steering column and damping system in the first embodiment can also be adopted.

Although the invention has been explained in relation to its preferred embodiment, it is to be understood that many other possible modifications and variations can be made without departing from the spirit and scope of the invention as hereinafter claimed.

What is claimed is:

1. An inverted tricycle, including:
   a deflecting and a steering mechanism, a rear frame, a driving wheel, and two front wheels, said deflecting and steering mechanism being configured on the front end of said rear frame, said two front wheels and said deflecting and steering mechanism being connected, and symmetrically configured on the left and right sides of the front end of the rear frame, with said rear frame as the axis of symmetry, and said driving wheel being configured on the rear end of said rear frame;
   the deflecting and steering mechanism includes a main frame, left front arm component and right front arm component symmetrically configured on the two sides of said main frame;
   the left front arm component includes left upper rocker arm, left lower rocker arm and left steering joint structure, the first end of said left upper rocker arm is hinged to the main frame through first pivotal structure, the first end of said left lower rocker arm is hinged to the main frame through second pivotal structure, the second ends of the left upper rocker arm and left lower rocker arm are respectively hinged to the upper and lower ends of the left steering joint structure through third pivotal structure and fourth pivotal structure, and the axes of rotation of the first pivotal structure, second pivotal structure, third pivotal structure, and fourth pivotal structure are perpendicular to the same plane;
   the right front arm component includes right upper rocker arm, right lower rocker arm and right steering joint structure, the first end of said right upper rocker arm is hinged to the main frame through fifth pivotal structure, the first end of said right lower rocker arm is hinged to the main frame through sixth pivotal structure, the second ends of said right upper rocker arm and right lower rocker arm are respectively hinged to the upper and lower ends of said right steering joint structure through seventh pivotal structure and eighth pivotal structure, and the axes of rotation of fifth pivotal structure, sixth pivotal structure, seventh pivotal structure, and eighth pivotal structure are perpendicular to the same plane;
   the first pivotal structure and the fifth pivotal structure share the same axis, and the second pivotal structure and the sixth pivotal structure share the same axis;
   the deflecting and steering mechanism also includes a steering structure, the steering structure includes a front steering column, a main steering column, and a universal steering mechanism, the front steering column equipped through the main frame, an upper end of the front steering column connected to the main steering column, while its lower end connected to a middle position of the universal steering mechanism, two ends of the universal steering mechanism respectively connected to left steering joint structure and right steering joint structure;
   the universal steering mechanism includes a cross axle, left connecting rod, and right connecting rod, the lower end of said front steering column hinged to a first axle portion of the cross axle, a second axle portion of the cross axle hinged to the left connecting rod and right connecting rod, the left connecting rod connected to the left steering joint structure and the cross axle, while the right connecting rod connected to the right steering joint structure and the cross axle.

2. The inverted tricycle defined in claim 1 wherein said main frame includes front frame and main beam, said main beam being in a "C" shape, and said front frame configured on an open side of the "C" shape of said main beam.

3. The inverted tricycle defined in claim 2, wherein said main beam includes said C-shaped beam body, said C-shaped beam body having a top longitudinal extending portion and a bottom longitudinal extending portion; said top longitudinal extending portion, bottom longitudinal extending portion, and C-shaped beam body are formed integrally; the top of said top longitudinal extending portion is provided with a front steering column mounting hole, and the top longitudinal extending portion combines with a front steering column through a front steering column mounting hole; said front steering column is equipped through the front steering column mounting hole of said main beam, and the bottom end of said front steering column extends downward to the inner space of the C shape of the C-shaped beam body of the main beam.

4. The inverted tricycle defined in claim 3, wherein an upper portion of the front side of said top longitudinal extending portion is provided with a front frame upper section connecting hole, while a lower portion of the front side of said top longitudinal extending portion is provided with a front frame middle section connecting hole; a rear side of said top longitudinal extending portion is provided with a rear frame upper section connecting hole; said top longitudinal extending portion fixes and connects to the upper section of the front frame through the front frame upper section connecting hole, and fixes and connects to the middle section of the front frame through the front frame middle section connecting hole; said top longitudinal extending portion fixes and connects to an upper section of the rear frame through the rear frame upper section connecting hole.

5. The inverted tricycle defined in claim 3, wherein the front side of said bottom longitudinal extending portion is provided with a front frame lower section connecting hole; the rear side of said bottom longitudinal extending portion is provided with a rear frame lower section connecting hole; said bottom longitudinal extending portion fixes and connects to the lower section of the front frame through the front frame lower section connecting hole, and fixes and connects to the lower section of the rear frame through the rear frame lower section connecting hole.

6. The inverted tricycle defined in claim 3, wherein a rear side of said C-shaped beam body is provided with a rear frame middle section connecting hole; said C-shaped beam body fixes and connects to the rear frame through the rear frame middle section connecting hole.

7. The inverted tricycle defined in claim 2, wherein said main beam is formed integrally.

8. The inverted tricycle defined in claim 1 wherein said left steering joint structure and right steering joint structure include upper rotary head, lower rotary head, center axle, and sleeve, said center axle connecting said upper rotary head and lower rotary head, said sleeve encasing said center axle, said sleeve and said center axle connected through a bearing, and said sleeve also configured with an axle to mount the wheel.

9. The inverted tricycle defined in claim 8, wherein a center line of the sleeve and the axle to mount the wheel cross each other vertically in a three-dimensional space; a water-proof seal ring is arranged between said sleeve and said center axle.

10. The inverted tricycle defined in claim 8, wherein said deflecting and steering mechanism also includes a wheel unit, said wheel unit equipped on the axle of said sleeve to mount the wheel.

11. The inverted tricycle defined in claim 10, wherein said wheel unit includes a wheel, said wheel provided with an axle hole, with oil seal, bearing, and bearing bush serially configured inside the axle hole, the end cap is configured on the outer end of the axle hole, and a brake disc is fixed on the inner side of the axle hole through a screw; the periphery of said wheel is configured with a spoke, and outside the spoke, a rim is provided.

12. The inverted tricycle defined in claim 1 wherein said left lower rocker arm and said right lower rocker arm are respectively configured with supporting pieces, and a damping system is connected to the supporting pieces on said left and right lower rocker arms.

13. The inverted tricycle defined in claim 1 wherein an upper end of said front steering column is in a ring shape, said left upper rocker arm and said right upper rocker arm are respectively configured with supporting pieces, a damping system is connected to the supporting pieces on said left and right upper rocker arms, and said damping system goes through the ring shape of the upper end of said front steering column.

14. The inverted tricycle defined in claim 13, wherein an axis line of said damping system share the same plane with said left and right steering joint structures.

15. An inverted tricycle, including:
a deflecting and a steering mechanism, a rear frame, a driving wheel, and two front wheels, said deflecting and steering mechanism being configured on the front end of said rear frame, said two front wheels and said deflecting and steering mechanism being connected, and symmetrically configured on the left and right sides of the front end of the rear frame, with said rear frame as the axis of symmetry, and said driving wheel being configured on the rear end of said rear frame;
the deflecting and steering mechanism includes a main frame, left front arm component and right front arm component symmetrically configured on the two sides of said main frame;
the left front arm component includes left upper rocker arm, left lower rocker arm and left steering joint structure, the first end of said left upper rocker arm is hinged to the main frame through first pivotal structure, the first end of said left lower rocker arm is hinged to the main frame through second pivotal structure, the second ends of the left upper rocker arm and left lower rocker arm are respectively hinged to the upper and lower ends of the left steering joint structure through third pivotal structure and fourth pivotal structure, and the axes of rotation of the first pivotal structure, second pivotal structure, third pivotal structure, and fourth pivotal structure are perpendicular to the same plane;
the right front arm component includes right upper rocker arm, right lower rocker arm and right steering joint structure, the first end of said right upper rocker arm is hinged to the main frame through fifth pivotal structure, the first end of said right lower rocker arm is hinged to the main frame through sixth pivotal structure, the second ends of said right upper rocker arm and right lower rocker arm are respectively hinged to the upper and lower ends of said right steering joint structure through seventh pivotal structure and eighth pivotal structure, and the axes of rotation of fifth pivotal structure, sixth pivotal structure, seventh pivotal structure, and eighth pivotal structure are perpendicular to the same plane;
the first pivotal structure and the fifth pivotal structure share the same axis, and the second pivotal structure and the sixth pivotal structure share the same axis;
the deflecting and steering mechanism also includes a steering structure, the steering structure includes a front steering column, a main steering column, and a universal steering mechanism, the front steering column equipped through the main frame, an upper end of the front steering column connected to the main steering column, while its lower end connected to a middle position of the universal steering mechanism, two ends of the universal steering mechanism respectively connected to left steering joint structure and right steering joint structure;
the universal steering mechanism includes a left pull rod and a right pull rod, the two ends of the left pull rod and the right pull rod respectively configured with rod end knuckle bearings; the inner ring body of the rod end knuckle bearing on the inner side of the left pull rod is connected to the inner ring body of the rod end knuckle bearing on the inner side of the right pull rod.

16. The inverted tricycle defined in claim 15 wherein said left pull rod is connected to said left steering joint structure through the inner ring body of the rod end knuckle bearing on its outer side, said right pull rod is connected to said right steering joint structure through the inner ring body of the rod end knuckle bearing on its outer side; a locking bolt goes through a center hole of the inner ring body of the rod end knuckle bearing on the inner side of said right pull rod as well as a center hole of the inner ring body of the rod end knuckle bearing on the inner side of said left pull rod, and connected to the bottom end of said front steering column.

17. The inverted tricycle defined in claim 15 wherein said left pull rod and said right pull rod are in a back-forth or up-down arrangement.

18. The inverted tricycle defined in claim 15 wherein a connection line, line 1, between a center point of the inner ring body of the rod end knuckle bearing on the outer side of said left pull rod and a center point of said driving wheel intersects the axis of rotation of said left steering joint structure; the connection line between the center point of the inner ring body of the rod end knuckle bearing on the outer side of said right pull rod and the center point of said driving wheel intersects the axis of rotation of said right steering joint structure.

* * * * *